Nov. 5, 1963  A. L. WELCH  3,109,525
WINCH CONTROL
Filed April 5, 1962
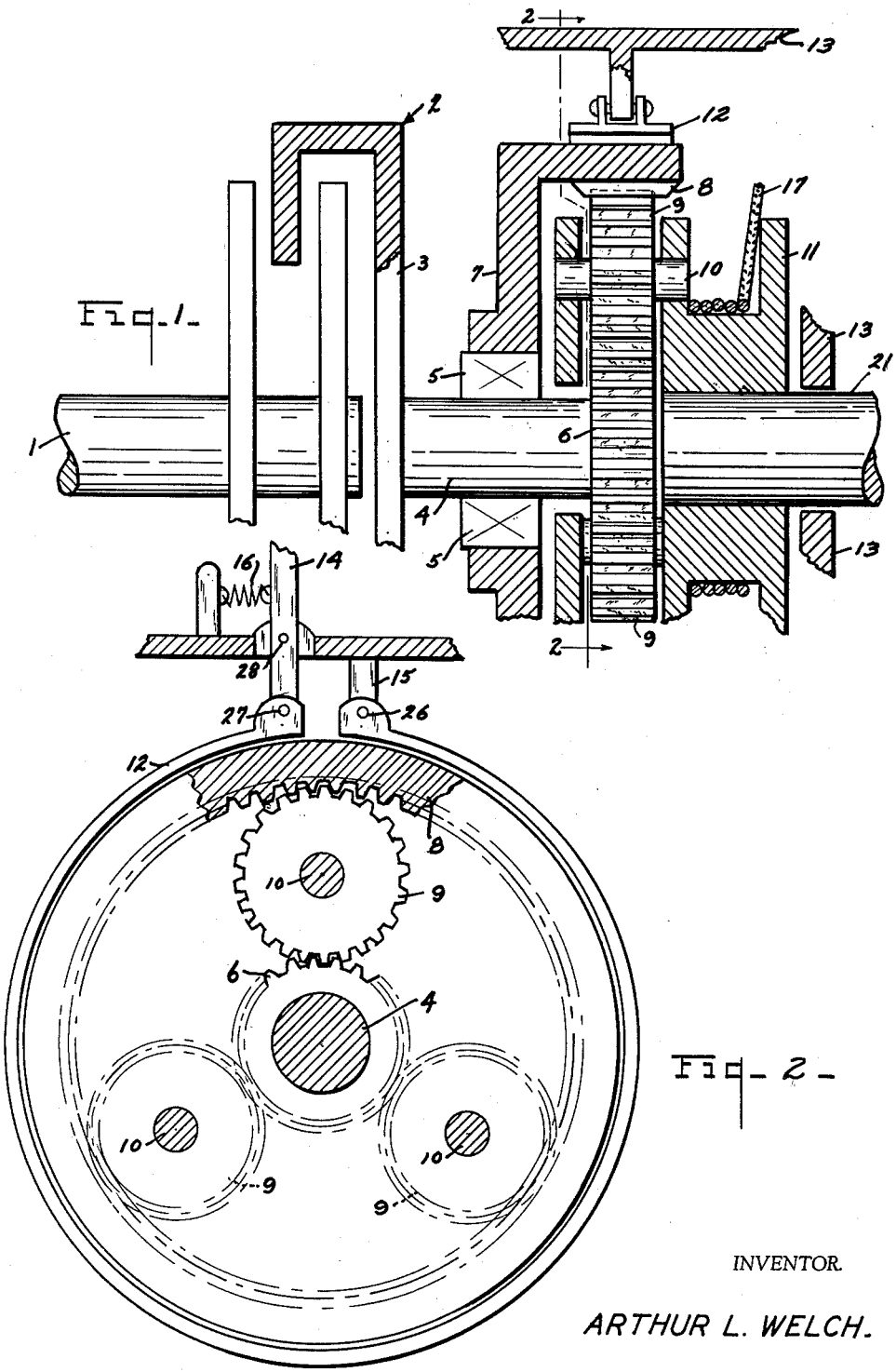
INVENTOR.
ARTHUR L. WELCH.

3,109,525
WINCH CONTROL
Arthur L. Welch, Box 731, Wasilla, Alaska
Filed Apr. 5, 1962, Ser. No. 185,351
3 Claims. (Cl. 192—4)

This invention relates to a winch of the type used on heavy machinery, sometimes known to the trade as a cable control unit. One type consists of a constantly rotated gear train driving a cone type clutch or a multiple disc bimetallic friction clutch transmitting the output directly to a cable drum. Another type unit employs a planetary gear unit wherein the sun gear is constantly rotated, with the ring gear being braked by a band brake to cause the pinion gear carrier and attached cable drum to rotate. It is in this last type that I have created my improvement.

In both types described above the cable drum is held from reverse rotation by a self energizing brake band held under tension by a spring. This brake band is not released when the cable is wound in, and is therefore subject to unnecessary wear, as well as having the disadvantage of wasting a certain amount of power necessary to overcome the brake band's tension spring. It can be seen that the clutches mentioned above must be of high capacity. It can also be seen that releasing the brake band will allow free spooling of the cable drum, a necessary feature in cable control units.

The object of this invention is to provide a winch which has a low capacity clutch on the gear train input shaft, yet is capable of free spooling the cable drum at will. The unnecessary wear on the brake band described above is also eliminated. This operation will be explained in the following description.

Referring to my drawings which form part of the present specification, FIGURE 1 shows a side view of my invention, and FIGURE 2 shows the planetary gear train and brake arrangement taken substantially on line 2—2 of FIG. 1. No detail is shown in the clutch 2, which is of known manufacture and may be of single or multiple disc construction, and either cam or screw actuated, or possibly air or hydraulic controlled. Also no bearings necessary to maintain alignment and absorb thrust are shown, nor are necessary lubricant seals.

Power from the prime mover not shown is transmitted by the shaft 1 through the disc clutch 2, of known manufacture. This shaft 1 and driving parts of the clutch 2 are always rotating when the prime mover not shown is running. Upon demand the driven parts of the clutch 2 drive the flange 3 and attached clutch output shaft, or sun gear supporting shaft 4, thus causing the sun gear 6 to rotate. Since the sun gear 6 meshes with the pinion gears 9 which react against the internal toothed ring gear 8, the pinion gears 9 rotate on the pins 10 which are supported by the pinion gear carrier 11 and impart rotation to it through the action of the pinion gears 9 traveling around inside the ring gear 8, held stationary by the brake band 12. This rotation of the pinion gear carrier 11 winds in the cable 17 as desired on cable drum 11 mounted on the cable drum shaft 21, since the cable drum 11 and the pinion gear carrier 11 are one unit.

The brake band 12 is anchored to the transmission case 13 by the anchor pin 15. Tension is supplied to the brake band 12 through the release lever 14 being pulled by the spring 16. It should be noted that the drum surface on the ring gear 8 does not rotate forward against brake band 12 tension during winding in of the cable 17 as in conventional units. This feature will greatly prolong the life of the brake band 12, and will also save the considerable power needed to overcome the brake band's 12 tension. Pivot pins 26, 27 and 28 are used as shown in the drawing.

The ring gear 8 is held against rearward rotation by the brake band 12, but as soon as power ceases to flow through the clutch 2 to the sun gear 6 any pull on the cable 17 will cause the drum and pinion gear carrier 11 to rotate backwards, thus also causing the sun gear 6 to rotate backwards at a speed several times that of the pinion carrier 11, determined by the planetary gear unit's gear ratio. To prevent this I have installed a sprag or one way brake 5 between the sun gear driveshaft 4 and the flange 7 supported by the ring gear 8. The action of these sprag clutches, also known as free wheel units or one way brakes, is positive and instantaneous in preventing reverse rotation, yet they have practically no resistance to forward rotation, a very important feature. They are in wide use in the automotive industry. The combination of this one way brake 5 and the brake band 12 cooperating to hold the whole planetary gear unit and therefore the cable drum 11 against rearward rotation, yet allowing free spooling of the cable drum 11 when the brake band 12 is released to allow the whole planetary gear unit to rotate backwards, embodies the newness of my invention. The provision for use of a single plate clutch situated outside the transmission case to prevent lubricant contamination and promote heat dissipation is of considerable economic importance also.

In the event a clutch of the cam operated over center type in wide use today is used with my invention, the adjusting mechanism should be adjusted so the actuating mechanism will not lock in by traveling over center. Time for clutch adjustment will be determined by the point at which the clutch "snaps in" through wear. Adjustment must be made with the prime mover stopped as against common operator practice of adjustment with the prime mover running in many older types. This provides an additional safety feature.

I claim as my invention an improvement:

1. In a winch, the combination of a winch frame, a prime mover power shaft, a sun gear supporting shaft, a cable drum supporting shaft, a radial flange attached to the forward end of said sun gear supporting shaft and a sun gear fixed to the rear end of said sun gear supporting shaft, a friction disc clutch mounted between and connecting said power shaft with said radial flange for effecting rotation of said sun gear by said power shaft, a plurality of pinion gears meshing with said sun gear and rotatably mounted on pinion gear pins concentrically mounted about said sun gear and embedded in a pinion gear carrier, a cable drum mounted on said cable drum supporting shaft and formed with radially outwardly extending integral flanges on the forward and rearward ends thereof, the said integral flange on the forward end of said cable drum being said pinion gear carrier whereby said cable drum is rotated by movement of said pinion gear pins and pinion gears relative to said sun gear, a rotatable internal toothed ring gear meshing with said pinion gears and provided with an exterior braking surface, a brake band mounted about said ring gear brake surface with one end thereof rigidly anchored to said winch frame and arranged to automatically hold said ring gear against rotation in one direction, a release lever pivotally attached intermediate its ends to said winch frame and having a lower depending end portion and an upper end portion, said lower depending end portion of said release lever attached to the free end of said brake band, a tension spring connected between the said upper end portion of said release lever and said winch frame for resiliently holding said brake band against the brake drum surface of said ring gear, said ring gear having an inwardly extending radial flange with an end extension thereon, a one way brake mounted adjacent said sun gear supporting shaft and attached to said end extension of said radial flange of said ring gear and arranged for locking said sun gear supporting shaft to the ring gear thereby preventing rearward rotation of said sun gear mounted on said shaft.

2. In a winch, the combination of a winch frame, a prime mover power shaft, a sun gear supporting shaft, a cable drum supporting shaft, a radial flange attached to the forward end of said sun gear supporting shaft and a sun gear fixed to the rear end of said sun gear supporting shaft, a friction disc clutch mounted between and connecting said power shaft with said radial flange for effecting rotation of said sun gear by said power shaft, a plurality of pinion gears meshing with said sun gear and rotatably mounted on pinion gear pins concentrically mounted about said sun gear and embedded at one end in a pinion gear carrier, a cable drum mounted on said cable drum supporting shaft and formed with radially outwardly extending integral flanges of the forward and rear ends thereof, the said integral flange on the forward end of said cable drum being said pinion gear carrier whereby said cable drum is rotated by movement of said pinion gear pins and pinion gears relative to said sun gear, a rotatable internal toothed ring gear meshing with said pinion gears and provided with an exterior braking surface, a brake band mounted about said ring gear brake surface with one end thereof rigidly anchored to said winch frame and arranged to automatically hold said ring gear against rotation in one direction, a release lever pivotally attached to said winch frame and to the free end of said brake band, a tension spring connected between said lever and said winch frame for resiliently holding said brake band against the brake band surface of said ring gear, said ring gear having an inwardly extending radial flange with an end extension thereon, a one way brake mounted adjacent said sun gear supporting shaft and attached to said end extension of said radial flange of said ring gear and arranged for locking said sun gear supporting shaft to the ring gear thereby preventing rearward rotation of said sun gear mounted on said shaft.

3. In a winch, the combination of a winch frame, a prime mover power shaft, a clutch output shaft, a cable drum supporting shaft, a radial flange attached to the forward end of said clutch output shaft and a sun gear fixed to the rear end of said clutch output shaft, a friction disc clutch mounted between and connecting said power shaft with said radial flange for effecting rotation of said sun gear by said prime mover power shaft, a plurality of pinion gears meshing with said sun gear and rotatably mounted on pinion gear pins concentrically mounted about said sun gear and arranged securely at one end in a pinion gear carrier, a cable drum mounted on said cable drum supporting shaft and formed with radially outwardly extending integral flanges on the forward and rearward ends thereof, the said integral flange on the forward end of said cable drum forming said pinion gear carrier whereby said cable drum is rotated by movement of said pinion gear pins and pinion gears relative to said sun gear, a rotatable internal toothed ring gear meshing with said pinions gears and provided with an exterior braking surface, a brake band mounted about said ring gear brake surface with one end thereof rigidly anchored to said winch frame and arranged to automatically hold said ring gear against rotation in one direction, a release lever pivotally attached intermediate its ends to said winch frame and having a lower depending end portion attached to the free end of said brake band, a tension spring connected between said release lever and said frame for resiliently holding said brake band against the brake drum surface of said ring gear, said ring gear having an inwardly extending radial flange with a foot type end extension thereon, a one way brake mounted adjacent said clutch output shaft and attached to said end extension of said radial flange of said ring gear and arranged for locking said clutch output shaft to the ring gear thereby preventing rearward rotation of said sun gear mounted on said shaft.

References Cited in the file of this patent
UNITED STATES PATENTS

| | | |
|---|---|---|
| 400,150 | Weston | Mar. 26, 1889 |
| 990,914 | Shepard | May 2, 1911 |
| 1,122,924 | Henderson | Dec. 29, 1914 |
| 1,323,550 | MacFarlane | Dec. 2, 1919 |
| 2,053,055 | Wadd | Sept. 1, 1936 |
| 2,284,047 | Edwards | May 26, 1942 |
| 2,681,205 | Bannister et al. | June 15, 1954 |
| 2,769,430 | Geyer | Nov. 6, 1956 |